(12) United States Patent
Liao et al.

(10) Patent No.: US 11,739,226 B2
(45) Date of Patent: Aug. 29, 2023

(54) ENVIRONMENTALLY FRIENDLY ANTI-CORROSION COATING MATERIAL AND METHOD FOR PREPARING THE SAME

(71) Applicant: NAN YA PLASTICS CORPORATION, Taipei (TW)

(72) Inventors: Te-Chao Liao, Taipei (TW); Chun-Che Tsao, Taipei (TW); Shih-Hsun Yen, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 161 days.

(21) Appl. No.: 17/394,411

(22) Filed: Aug. 5, 2021

(65) Prior Publication Data
US 2022/0267611 A1 Aug. 25, 2022

(30) Foreign Application Priority Data
Feb. 24, 2021 (TW) .................................. 110106471

(51) Int. Cl.
*C09D 5/08* (2006.01)
*C09D 163/00* (2006.01)
*C09D 7/45* (2018.01)
*C09D 5/24* (2006.01)

(52) U.S. Cl.
CPC ................ *C09D 5/08* (2013.01); *C09D 5/24* (2013.01); *C09D 7/45* (2018.01); *C09D 163/00* (2013.01)

(58) Field of Classification Search
CPC ... C09D 5/08; C09D 5/24; C09D 7/45; C09D 163/00; C09D 7/65; C08L 2201/04
See application file for complete search history.

(56) References Cited

U.S. PATENT DOCUMENTS

| | | | | |
|---|---|---|---|---|
| 2004/0005464 A1* | 1/2004 | Ha | ......................... | C09D 5/082 |
| | | | | 428/413 |
| 2007/0114498 A1* | 5/2007 | Geer | ........................ | C09D 5/10 |
| | | | | 252/500 |
| 2010/0010119 A1* | 1/2010 | Zaarei | ....................... | C09D 7/62 |
| | | | | 523/461 |
| 2014/0170418 A1 | 6/2014 | Percec et al. | | |
| 2015/0184304 A1 | 7/2015 | Kumar et al. | | |
| 2020/0317932 A1 | 10/2020 | Chugoku | | |

(Continued)

FOREIGN PATENT DOCUMENTS

| CN | 1243852 A | 2/2000 |
|---|---|---|
| CN | 101508866 A | 8/2009 |
| CN | 101418182 B | 12/2011 |

(Continued)

*Primary Examiner* — Mark Kopec
*Assistant Examiner* — Jaison P Thomas
(74) *Attorney, Agent, or Firm* — Li & Cai Intellectual Property Office

(57) ABSTRACT

An environmentally friendly anti-corrosion coating material and a method for preparing the same are provided. The environmentally friendly anti-corrosion coating material includes 80 to 90 parts by weight of an epoxy resin, 3 to 7 parts by weight of at least one conductive polymer, 55 to 65 parts by weight of curing agent, and at least one functional additive. The at least one conductive polymer is selected from the group consisting of polyacetylene, polypyrrole, polyaniline, polythiophene and poly(p-phenylene).

9 Claims, 2 Drawing Sheets

(56) References Cited

U.S. PATENT DOCUMENTS

2021/0031942 A1    2/2021  Brei et al.

FOREIGN PATENT DOCUMENTS

| | | | |
|---|---|---|---|
| CN | 102634266 A | 8/2012 | |
| CN | 102876196 A | 1/2013 | |
| CN | 102876196 B | 2/2016 | |
| CN | 105385265 A | 3/2016 | |
| CN | 105462435 A | 4/2016 | |
| CN | 108384427 A | 8/2018 | |
| CN | 110922803 A | 3/2020 | |
| CN | 111205734 A | 5/2020 | |
| CN | 111574954 A | 8/2020 | |
| JP | 11246819 A | 9/1999 | |
| JP | 11256099 A | 9/1999 | |
| JP | H11246819 * | 9/1999 | ............... C09D 5/10 |
| JP | 2015157892 A | 9/2015 | |
| JP | 202120452 A | 2/2021 | |
| WO | WO2017146193 A1 | 8/2017 | |

\* cited by examiner

ENVIRONMENTALLY FRIENDLY ANTI-CORROSION COATING MATERIAL AND METHOD FOR PREPARING THE SAME

CROSS-REFERENCE TO RELATED PATENT APPLICATION

This application claims the benefit of priority to Taiwan Patent Application No. 110106471, filed on Feb. 24, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an anti-corrosion coating material, and more particularly to an environmentally friendly anti-corrosion coating material and a method for preparing the same.

BACKGROUND OF THE DISCLOSURE

According to statistics, hundreds of billions of dollars are lost due to corrosion across the world each year. Taiwan is located in the subtropical zone, and has an island climate characterized by high temperature, high humidity, and high salinity. Due to the booming industrial development and the rapid increase of vehicles, almost all coastal areas are classified as C5 (very high corrosivity) according to ISO classification standards, and some areas even exceed C5 in corrosion levels. In such a corrosive environment, an anti-corrosion treatment must be performed on metal structures (such as steel structures) to slow down changes in the metal structures, so as to prevent or reduce the occurrence of industrial safety incidents, reduce social costs, and improve economic benefits.

Currently, using an anti-corrosion coating material for coating is one of the most convenient treatment methods. The anti-corrosion coating material is coated onto a surface of the metal structures, so as to prevent oxygen, water vapor and salt from contacting the metal structures and causing corrosion. A metal coating and an organic coating are mostly used to prevent corrosion. The principle behind the metal coating is a sacrificial anode method, in which a sacrificial metal that is more active to oxygen and more likely to be oxidized and corroded is used as an anode, so as to protect an underlying substrate. However, a disadvantage of the metal coating is that the sacrificial metal is prone to self-consumption, and is difficult to be coated again. For the organic coating, an anti-corrosion function is achieved by physical barrier and the addition of rust inhibitors. However, one of the disadvantages of organic coatings is that volatile organic compounds tend to escape. In addition, the rust inhibitors are mostly heavy metals, which easily pollute the environment and harm the human body.

SUMMARY OF THE DISCLOSURE

In response to the above-referenced technical inadequacies, the present disclosure provides an environmentally friendly anti-corrosion coating material, which is non-toxic and harmless to the environment and human body, and a method for preparing the environmentally friendly anti-corrosion coating material.

In one aspect, the present disclosure provides an environmentally friendly anti-corrosion coating material, which is used for forming at least one anti-corrosion coating layer on a structure. The environmentally friendly anti-corrosion coating material includes 80 to 90 parts by weight of an epoxy resin, 3 to 7 parts by weight of at least one conductive polymer, 55 to 65 parts by weight of a curing agent, and at least one functional additive. The at least one conductive polymer is selected from the group consisting of polyacetylene, polypyrrole, polyaniline, polythiophene and poly(p-phenylene).

In another aspect, the present disclosure provides a method for preparing an environmentally friendly anti-corrosion coating material, which includes the following steps. A resin composition is provided, and the resin composition includes 80 to 90 parts by weight of an epoxy resin, 3 to 7 parts by weight of at least one conductive polymer, and at least one functional additive, and the at least one conductive polymer is selected from the group consisting of polyacetylene, polypyrrole, polyaniline, polythiophene and poly(p-phenylene). The resin composition is milled and dispersed, and then a curing agent is added into the resin composition that is milled and dispersed.

In certain embodiments, the at least one conductive polymer is polyaniline.

In certain embodiments, the at least one functional additive includes 1 to 3 parts by weight of the defoaming agent.

In certain embodiments, the at least one functional additive includes 1 to 3 parts by weight of anti-sagging agent.

In certain embodiments, the at least one functional additive includes 0.5 to 1.5 parts by weight of the anti-settling agent.

In certain embodiments, the at least one functional additive includes 1 to 3 parts by weight of the ultraviolet absorber.

In certain embodiments, the resin composition is milled and dispersed by a triple roll mill.

Therefore, by virtue of "the environmentally friendly anti-corrosion coating material including 80 to 90 parts by weight of the epoxy resin, 3 to 7 parts by weight of the at least one conductive polymer, 55 to 65 parts by weight of the curing agent, and the at least one functional additive", the environmentally friendly anti-corrosion coating material provided by the present disclosure can provide a good anti-corrosion effect for metal materials without adding heavy metals, volatile organic compounds (VOC) and other harmful substances, and can therefore avoid endangering human health and polluting the environment. In addition, the method of the present disclosure can improve the processability of the environmentally friendly anti-corrosion coating material.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
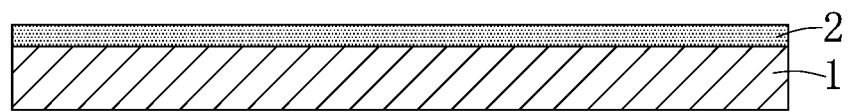
FIG. 1 is a schematic view of an environmentally friendly anti-corrosion coating material according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
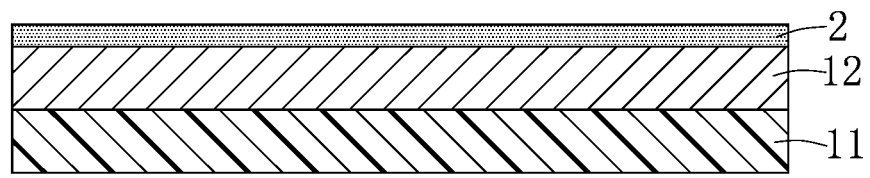
FIG. 2 is a schematic view of the environmentally friendly anti-corrosion coating material according to another embodiment of the present disclosure.

Referring to FIG. 1 to FIG. 2, one embodiment of the present disclosure provides an environmentally friendly anti-corrosion coating material, which is used for forming one or more than one anti-corrosion coating layer 2 on a structure 1. Accordingly, the structure 1 has good corrosion and saltwater resistance, and high temperature and humidity resistance. The structure 1 can be a metal structure (such as steel structure), as shown in FIG. 1. Alternatively, the structure 1 can be a metal-plastic composite structure (such as a housing of an electronic device), which may include a plastic component 11 and a metal component 12 disposed on the plastic component 11, as shown in FIG. 2. In practice, the environmentally friendly anti-corrosion coating material of the present disclosure can be applied to a metal surface of the structure 1 by suitable coating methods (such as spraying and brushing), and after drying and curing, an anti-corrosion coating layer 2 is formed. The thickness of the anti-corrosion coating layer 2 can be from 200 μm to 400 μm.

Further, the environmentally friendly anti-corrosion coating material of the present disclosure adopts an epoxy resin system, which mainly includes 80 to 90 parts by weight of an epoxy resin, 3 to 7 parts by weight of at least one conductive polymer, 55 to 65 parts by weight of a curing agent, and at least one functional additive. It is worth mentioning that in the presence of the conductive polymer, the anti-corrosion coating layer 2 can prevent electrons inside the structure 1 from flowing out, so as to achieve the effect of preventing corrosion or reducing a corrosion rate. In practice, the at least one conductive polymer can be selected from the group consisting of polyacetylene (PA), polypyrrole (PPy), polyaniline (PANI), polythiophene (PT) and poly(p-phenylene) (PPP), and is preferably polyaniline.

As the epoxy resin of the environmentally friendly anti-corrosion coating material, a polymer or oligomer containing two or more epoxy groups in the molecular structure can be used. In consideration of corrosion resistance, an epoxy equivalent of the epoxy resin can be from 150 to 220, and is preferably from 180 to 190. In certain embodiments, the environmentally friendly anti-corrosion coating material can be one or more than one of the following: a bisphenol type epoxy resin, a glycidyl ester type epoxy resin, a glycidyl amine type epoxy resin, a phenol novolak type epoxy resin, a cresol type epoxy resin, a dimer polymer acid-modified epoxy resin, an aliphatic epoxy resin, an alicyclic epoxy resin and an epoxidized oil-based epoxy resin. In addition, in consideration of adhesion to the structure 1, the bisphenol type epoxy resin is preferred, and a bisphenol A type epoxy resin is more preferred.

As the curing agent of the environmentally friendly anti-corrosion coating material, an amine-based curing agent can be used, and aliphatic, alicyclic, aromatic and heterocyclic amine curing agents are preferred. An active hydrogen equivalent of the amine-based curing agent can be from 70 to 120, and is preferably from 100 to 120.

Examples of the aliphatic amine curing agent include alkylene polyamines and polyalkylene polyamines. The aforementioned alkylene polyamines can be a compound represented by the following formula: $H_2N-R_1-NH_2$, where $R_1$ is divalent hydrocarbon group with 1 to 12 carbons (any hydrogen atom of this hydrocarbon group can be substituted with a hydrocarbon group with 1 to 10 carbons), and specific examples include: methylene diamine, ethylene diamine, 1,2-diaminopropane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, and trimethylhexamethylenediamine. The aforementioned polyalkylene polyamines can be a compound represented by the following formula: $H_2N-(C_mH_{2m}NH)_nH$, where m is an integer from 1 to 10, n is an integer from 2 to 10, and is preferably an integer from 2 to 6, and specific examples include diethylene triamine, dipropylene triamine, triethylene tetramine, tripropylene tetraamine, tetraethylene pentamine, tetrapropylene pentamine, pentaethylene hexaamine and nona ethylene decaamine. Apart from the above, the aliphatic amine curing agent can include tetra(aminomethyl)methane, tetrakis(2-aminoethylaminomethyl)methane, 1,3-bis(2'-aminoethyl) amino) propane, triethylene-bis(trimethylene)hexaamine, bis(3-aminoethyl)amine, bis(hexamethylene)triamine, bis(cyanoethyl) diethylenetri amine, and so on, which can also be used in the environmentally friendly anti-corrosion coating material.

The alicyclic amine curing agent includes bis(aminoalkyl) benzene, bis(aminoalkyl)naphthalene, and aromatic polyamines with two or more than two primary amine groups bonded to the benzene ring compound.

The aromatic amine curing agent includes o-xylene diamine, m-xylene diamine (MXDA), p-xylene diamine, phenylene diamine, naphthalene diamine, diamino diphenyl methane, diamino diethyl phenyl methane, 2,2-bis(4-aminophenyl)propane, 4,4'-diaminodiphenyl ether, 4,4'-diaminobenzophenone, 4,4'-diaminodiphenyl ether, 4,4'-diaminodiphenyl sulfide, 2,2'-dimethyl-4,4'-diaminodiphenylmethane, 2,4'-diaminobiphenyl, 2,3'-dimethyl-4,4'-diaminobiphenyl, 3,3'-dimethoxy-4,4'-diaminobiphenyl, bis(aminomethyl)naphthalene, and bis(aminoethyl)naphthalene.

The heterocyclic amine curing agent includes N-methylpiperazine, morpholine, 1,4-bis-(3-aminopropyl)-piperazine, piperazine-1,4-diazepane, 1-(2'-aminoethylpiperazine), 1-[2'-(2"-aminoethylamino)ethyl]piperazine, 1,11-diazacycloeicosan, and 1,15-diazacyclooctadecane.

As the curing agent of the environmentally friendly anti-corrosion coating material, an acid anhydride curing agent can also be used. The acid anhydride curing agent includes phthalic anhydride, tetrahydrophthalic anhydride, methyltetrahydrophthalic anhydride, 3,6-endomethylenetetrahydrophthalic anhydride, hexachloroendomethylenetetrahydrophthalic anhydride, and methyl-3,6-endomethylenetetrahydrophthalic anhydride.

In this embodiment, the at least one functional additive can include 1 to 3 parts by weight of defoaming agent, 1 to 3 parts by weight of the anti-sagging agent, 0.5 to 1.5 parts by weight of the anti-settling agent, and 1 to 3 parts by weight of the ultraviolet absorber. The defoaming agent can include polysiloxane polymers, hydrophobic solid particles and polyether modified silicone oils. The anti-sagging agent can be polyamide wax. The anti-settling agent can include polyamide wax and oxidized polyethylene wax. The ultraviolet absorber can include benzylidene malonate and hindered amine light stabilizers (HALS). Further, the defoaming agent can produce a defoaming effect in the coating material and accelerate the discharge of gas, so as to avoid defects on a surface of the anti-corrosion coating layer 2. The anti-sagging agent and the anti-settling agent can cooperate with each other to improve the processability of the coating material and the adhesion to the structure 1, and the ultraviolet absorber can improve the UV resistance of the anti-corrosion coating layer 2. However, while the above description refers only to the main function of the functional additives in the coating material, other beneficial effects can actually be provided as well.

Without departing from the spirit and scope of the present disclosure, the at least one functional additive can also include plasticizers, curing accelerators, stabilizers, antifouling agents, solvents, coloring pigments, and so on.

Figure 3:
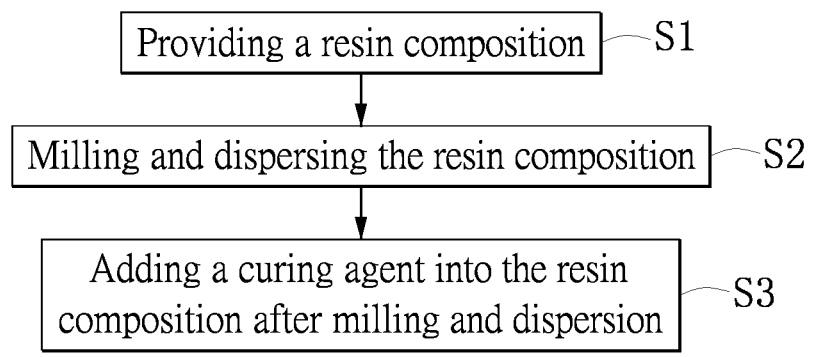
FIG. 3 is a flow chart of a method for preparing the environmentally friendly anti-corrosion coating material of the present disclosure.

Referring to FIG. 3, this embodiment of the present disclosure provides a method for preparing the aforementioned environmentally friendly anti-corrosion coating material, which at least includes the following steps: step S1, providing a resin composition; step S2, milling and dispersing the resin composition; and step S3, adding a curing agent into the resin composition after milling and dispersion.

Further, in step S1, the epoxy resin, the conductive polymer, and the functional additive are uniformly mixed by a high-speed mixer to form the resin composition. In step S2, the resin composition is milled and dispersed by a triple roll mill, and a distance of three rollers can be adjusted in the process to achieve the required fineness level. In step S3, the curing agent can be used to adjust the adhesion and curing speed of the coating material. In this embodiment, an equivalent ratio of the epoxy resin to the curing agent (i.e., the used amount of the curing agent/active hydrogen equivalent divided by the used amount of the epoxy resin/epoxy equivalent) can be from 0.4 to 0.8, and is preferably from 0.5 to 0.6.

EXPERIMENTAL EXAMPLE 1

Firstly, 90 parts by weight of the epoxy resin, 4.0 parts by weight of the polyaniline, 2.1 parts by weight of the defoaming agent, 2.4 parts by weight of the anti-sagging agent, 0.5 parts by weight of the anti-settling agent and 1.0 part by weight of the ultraviolet (UV) absorber are mixed uniformly, so as to form a resin composition. The resin composition is milled and dispersed by the triple roll mill, so that the conductive polymer can be uniformly dispersed in the epoxy resin, and the fineness can be controlled at 20 to 30 μm. When used for coating, 60 parts by weight of the curing agent is added based on 100 parts by weight of the resin composition. After a uniform mixing and stirring, the environmentally friendly anti-corrosion coating material is formed.

EXPERIMENTAL EXAMPLE 2

Firstly, 87.5 parts by weight of the epoxy resin, 6.0 parts by weight of the polyaniline, 2.1 parts by weight of the defoaming agent, 2.4 parts by weight of the anti-sagging agent, 0.5 parts by weight of the anti-settling agent and 1.0 part by weight of the UV absorber are mixed uniformly, so as to form a resin composition. The resin composition is milled and dispersed by the triple roll mill, so that the conductive polymer can be uniformly dispersed in the epoxy resin, and the fineness can be controlled at 20 to 30 μm. When used for coating, 60 parts by weight of the curing agent is added based on 100 parts by weight of the resin composition. After a uniform mixing and stirring, the environmentally friendly anti-corrosion coating material is formed.

EXPERIMENTAL EXAMPLE 3

Firstly, 87.8 parts by weight of the epoxy resin, 6.0 parts by weight of the polyaniline, 1.7 parts by weight of the defoaming agent, 2.0 parts by weight of the anti-sagging agent, 1.5 parts by weight of the anti-settling agent and 1.0 part by weight of the UV absorber are mixed uniformly, so as to form a resin composition. The resin composition is milled and dispersed by the triple roll mill, so that the conductive polymer can be uniformly dispersed in the epoxy resin, and the fineness can be controlled at 20 to 30 μm. When used for coating, 55 parts by weight of the curing agent is added based on 100 parts by weight of the resin composition. After a uniform mixing and stirring, the environmentally friendly anti-corrosion coating material is formed.

Salt Spray Test

Test equipment:
Salt spray testing machine (brand: TERCHY, model: SST9NL).
Experiment method:
The anti-corrosion coating materials obtained from the experimental examples 1 to 3 are each coated on a 7 cm×15 cm steel plate (test plate), and dried to form a coating with a thickness of 300 μm. In an environment with a temperature of 23±2° C. and a relative humidity of 50±15%, the following test conditions are used to conduct a salt spray test on the coated test plates in accordance with ASTM B117-16. After the test, appearances of the test plates are observed, and the results are shown in Table 1.
Test conditions:
1. Concentration of saline solution: 50±5 g/L
2. pH value of salt spray: 6.5 to 7.2
3. Air pressure: 1.0 kgf/cm$^2$
4. Salt spray room temperature: 35.0±2.0° C.

5. Saturated air temperature: 46 to 49° C.
6. Spray amount: 1.0 to 2.0 ml/80 cm2/h
7. Placement angle of test plate: 20±5°
8. Test time: 1000 hours

TABLE 1

| Experimental example | Test results (Visual inspection) |
| --- | --- |
| 1 | No rust, swelling and peeling phenomenon |
| 2 | No rust, swelling and peeling phenomenon |
| 3 | No rust, swelling and peeling phenomenon |

Beneficial Effects of the Embodiments

In conclusion, by virtue of "the environmentally friendly anti-corrosion coating material including 80 to 90 parts by weight of the epoxy resin, 3 to 7 parts by weight of the at least one conductive polymer, 55 to 65 parts by weight of the curing agent, and the at least one functional additive", the environmentally friendly anti-corrosion coating material provided by the present disclosure can provide a good anti-corrosion effect for metal materials without adding heavy metals, volatile organic compounds (VOC) and other harmful substances, and therefore will not endanger human health and pollute the environment. In addition, the method of the present disclosure can improve the processability of the environmentally friendly anti-corrosion coating material.

Further, in the presence of the conductive polymer, the anti-corrosion coating layer can prevent the electrons inside the structure from flowing out, so as to achieve the effect of preventing corrosion or reducing the corrosion rate. In addition, the anti-sagging agent and the anti-settling agent can cooperate with each other to improve the processability of the coating material and the adhesion to the structure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An environmentally friendly anti-corrosion coating material, which is used for forming at least one anti-corrosion coating layer on a structure, comprising:
    80 to 90 parts by weight of an epoxy resin;
    3 to 7 parts by weight of at least one conductive polymer, wherein the at least one conductive polymer is selected from the group consisting of polyacetylene, polypyrrole, polyaniline, polythiophene and poly(p-phenylene);
    55 to 65 parts by weight of a curing agent; and
    at least one functional additive that includes 1 to 3 parts by weight of a defoaming agent and 1 to 3 parts by weight of an anti-sagging agent.

2. The environmentally friendly anti-corrosion coating material according to claim 1, wherein the at least one conductive polymer is polyaniline.

3. The environmentally friendly anti-corrosion coating material according to claim 1, wherein the at least one functional additive includes 0.5 to 1.5 parts by weight of an anti-settling agent.

4. The environmentally friendly anti-corrosion coating material according to claim 3, wherein the at least one functional additive includes 1 to 3 parts by weight of an ultraviolet absorber.

5. A method for preparing an environmentally friendly anti-corrosion coating material, comprising:
    providing a resin composition that includes 80 to 90 parts by weight of an epoxy resin, 3 to 7 parts by weight of at least one conductive polymer, and at least one functional additive, wherein the at least one conductive polymer is selected from the group consisting of polyacetylene, polypyrrole, polyaniline, polythiophene and poly(p-phenylene), and the at least one functional additive includes 1 to 3 parts by weight of a defoaming agent and 1 to 3 parts by weight of an anti-sagging agent;
    milling and dispersing the resin composition; and
    adding a curing agent into the resin composition that is milled and dispersed.

6. The method according to claim 5, wherein the resin composition is milled and dispersed by a triple roll mill.

7. The method according to claim 5, wherein the at least one conductive polymer is polyaniline.

8. The method according to claim 5, wherein the at least one functional additive includes 0.5 to 1.5 parts by weight of an anti-settling agent.

9. The method according to claim 8, wherein the at least one functional additive includes 1 to 3 parts by weight of an ultraviolet absorber.

* * * * *